Nov. 6, 1973    B. SCHERHAG ET AL    3,770,759
PRODUCTION OF 2-MERCAPTOBENZTHIAZOLE
Filed Aug. 5, 1970
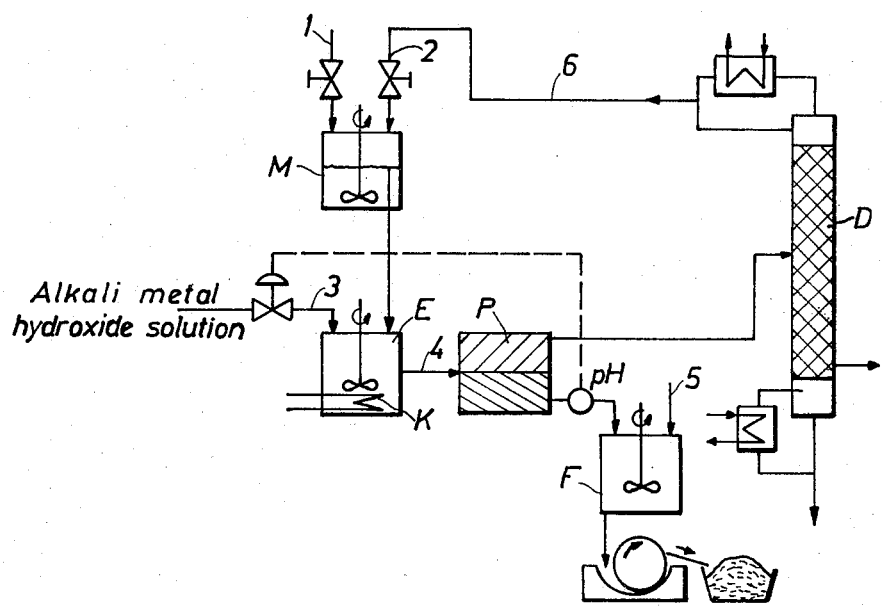
INVENTORS:
BERNHARD SCHERHAG, HERMANN WOLZ, ADOLF VON FRIEDRICH.

United States Patent Office 3,770,759
Patented Nov. 6, 1973

3,770,759
PRODUCTION OF 2-MERCAPTOBENZTHIAZOLE
Bernhard Scherhag, Hermann Wolz, and Adolf von Friedrich, Leverkusen, Germany, assignors to Bayer Aktiengesellschaft, Leverkusen, Germany
Filed Aug. 5, 1970, Ser. No. 61,047
Claims priority, application Germany, Aug. 14, 1969,
P 19 41 379.7
Int. Cl. C07d 91/48
U.S. Cl. 260—306     4 Claims

ABSTRACT OF THE DISCLOSURE

Recovering high purity product in high yield from a crude melt of aniline, sulphur and carbon disulphide by dissolving the hot melt in a solvent, extracting resulting solution with dilute aqueous alkali metal hydroxide and precipitation of product by acidification.

---

This invention relates to a process for the production of highly pure 2-mercaptobenzthiazole in high yields.

In the large-scale production of 2-mercaptobenzthiazole from aniline, sulphur and carbon disulphide as described, for example, in United States patent specification 1,631,871, the reaction product accumulates in the form of a dark-coloured melt in which it is mixed with large quantities of undesirable secondary products, depending upon the products, depending upon the production techniques used. In order to obtain a product that can be subsequently used as a vulcanisation accelerator from a melt of this kind, the melt has to be processed.

To this end, the melt may be repeatedly recrystallised in suitable organic solvents or mixtures of such solvents until an adequately pure product is obtained. A process of this kind is described, for example, in German patent specification 541,295. Unfortunately, this process has the disadvantage that the mother liquor accumulating which still contains considerable quantities of 2-mercaptobenzthiazole has to be separately processed if it is desired to avoid losses of yield.

On the other hand, the melt can be allowed to solidify to a granulate by allowing it to flow into cold water which according to United States patent specification 2,117,120, for example, is acidified with a mineral acid or which, according to United States patent specification 3,030,373, has an emulsifier added to it. Any impurities adhering to the granulate thus obtained are removed by washing with a suitable solvent. Unfortunately, these processes have the disadvantage that the granulates formed have incorporated some of the impurities and cannot be completely freed from them even by washing with solvents.

On account of the difficulties referred to, these and similar processes have not been adopted for large-scale processing. In large scale operations, the hot melt is usually dissolved in a hot aqueous alkali metal solution and the 2-mercaptobenzthiazole precipitated by the addition of an acid. Examples of suitable alkali solutions include sodium hydroxide (United States patent specification 1,631,871), alkali metal carbonates (United States patent specification 2,137,820) or ammonium hydroxide or even milk of lime (United States patent specification 2,161,741).

However, since the impurities from the crude melt dissolve colloidally on flowing into the hot aqueous alkali metal hydroxide or carbonate solution, the 2-mercaptobenzthiazole salt solution has to be freed from these impurities so that when the solution is acidified to precipitate the 2-mercaptobenzthiazole the impurities do not settle on the precipitate which would adversely affect the qualities of the product.

This can be done, for example, by leaving the hot solution standing in large containers, as a result of which the colloidally dissolved substances coagulate. The solution is subsequently separated off from the coagulate by decantation. Considerable time is required for completely freeing the solution from these impurities. Accordingly, attempts have been made to accelerate separation of the impurities by mechanical or chemical methods. According to United States patent specification 2,631,153, for example, the solution is brightened by passing air through an aqueous 2-mercaptobenzthiazole salt solution.

In addition to the impurities that can be separated off by coagulation, however, the solution also contains specific starting materials or intermediate materials emanating from the process itself which enter the solution together with the hot melt. Such products include for example aniline, benzthiazole and phenyl isothiocyanate. In order to remove them from the solution, United States patent specification 2,658,864, for example, describes steam distilling the solution. According to Russian patent specification 179,306, the aqueous 2-mercaptobenzthiazole salt solution is extracted with organic solvents.

Although each of the aforementioned processes purifies the aqueous 2-mercaptobenzthiazole salt solution to a certain extent, the 2-mercaptobenzthiazole obtained is still not pure enough for most practical applications. This is attributable, for example, to the fact that when the hot crude melt flows into the heated aqueous alkali metal hydroxide solution the thiazole ring is partly split up. The degree to which the thiazole ring is split up is governed both by the reaction time and by the reaction temperature as well as by the concentration of the alkali metal hydroxide solution used. The reaction is a conventional reaction and is used, for example, in United States patent specification 3,102,142 for the production of aminothiophenols.

A plurality of compounds very similar to 2-mercaptobenzthiazole in their physical properties are obtained, since these compounds by virtue of their amphoteric bifunctional structure are able to react both with the 2-mercaptobenzthiazole and with one another. When the 2-mercaptobenzthiazole salt solution is acidified, these compounds are precipitated with the 2-mercaptobenzthiazole and contaminate it.

It has now been found that highly pure 2-mercaptobenzthiazole can be obtained in high yields from a pure melt formed from aniline, sulphur and carbon disulphide by a continuous or batch process, providing the hot crude melt is dissolved in a solvent, the 2-mercaptobenzthiazole extracted from the resulting solution with a dilute aqueous alkali metal hydroxide solution and precipitated by acidification.

Hydrocarbons which do not react with the ingredients of the crude melt and which dissolve the crude melt to form a homogeneous solution, may be used as the solvent. They should be insoluble in water and should not react with the aqueous alkali metal hydroxide solution. Following extraction of the 2-mercaptobenzthiazole, the solvent should be readily removable from the unextracted substances, for example by distillation, so that it can be recycled to the process without substantially any loss. Examples of hydrocarbons meeting these requirements include aliphatic, cycloaliphatic or aromatic hydrocarbons boiling at temperatures of from 60° C. to 160° C., although it is also possible to use lower- or higher-boiling fractions, such as hexane, heptane, octane, nonane and their isomers, hexyl chloride, heptyl chloride, cyclohexane, cyclohexyl chloride, methyl cyclohexane, ethyl cyclohexane, benzene, toluene, (o-, m-, p-) xylene, ethylbenzene, mesitylene, propylbenzene and chlorobenzene. o-, m- or p-xylene is preferably used.

An aqueous solution of sodium or potassium hydroxide or a mixture thereof may be used as the alkali metal hydroxide solution, although it is also possible to use other alkali metal hydroxides such as ammonium hydroxide. The concentration of the solutions should be adjusted so that the 2-mercaptobenzthiazole salt solution obtained after extraction contains from 1 to 50% by weight of 2-mercaptobenzthiazole. It is preferred to use such concentrations that the solution reaches a 2-mercaptobenzthiazole content of from 5 to 25% by weight.

Whilst the temperature of the solution is governed by the boiling point of the solvent, the temperature at which extraction is carried out can be varied. It should be as low as possible on account of the danger of ring cleavage. Although a temperature of from 10 to 50° C. is suitable, temperatures of from 20 to 30° C. are preferred. To prevent the heat of neutralisation from raising the temperature prevailing in the extractor beyond the upper limit specified during extraction, it can be of advantage in special cases to provide cooling facilities.

The process may be carried out either continuous or in batches. It is preferably carried out continuously by a procedure in which the solvent is also continuously purified and recycled to the process.

To illustrate the process, the accompanying figure diagrammatically illustrates an apparatus suitable for continuous operation. However, the process is not limited to this embodiment.

The crude melt with a temperature of from 180 to 220° C. is delivered through a metering unit 1 to a mixer M. The solvent is run in through the metering unit 2 in a constant proportion relative to the melt. The solution flows into an extractor E. The alkali metal hydroxide solution is delivered to the extractor in a stream regulated through 3, the hydrogen ion concentration behind the phase separation vessel P being used as the control quantity pH. The heat of neutralisation liberated is dissipated by means of a cooling coil K. The suspension of the solvent and extractant issuing from the mixer through 4 is separated in the phase separation vessel P, the aqueous lower phase containing the 2-mercaptobenzthiazole salt being admixed with mineral acid through 5 in accordance with a conventional process (for example the process disclosed in German patent specification 1,173,476), which results in precipitation of the 2-mercaptobenzthiazole in F. The upper organic or solvent phase is delivered to a distillation column D, in which the solvent is distilled off at the upper end, the impurities at the lower end and any relatively high boiling substances such as aniline or benzthiazole in a sidestream. The solvent returns to the process through 6. The product may be used as an intermediate in the production of plant protection agents and rubber chemicals, for example in accordance with United States patent specification 2,010,059.

EXAMPLE 1

(a) 50 g. of a crude 2-mercaptobenzthiazole melt with a temperature of 200° C. obtained by a continuous process for the production of 2-mercaptobenzthiazole from aniline, sulphur and carbon disulphide in accordance with United States patent specification 1,631,871, were run in to 100 g. of o-xylene heated to 135° C. A clear, darkbrown solution containing no undissolved components was formed. This solution was run with vigorous stirring into an aqueous sodium hydroxide solution heated to 15° C. containing 37 g. of sodium hydroxide per litre. After 1 minute, the stirring mechanism was switched off. The temperature had risen to 23° C. The phases immediately separated. The aqueous phase was separated off and the mercaptobenzthiazole precipitated by the addition of acid up to a pH value of 7. It was washed and dried. Analysis revealed a content of 98.8% (iodometric), less than 0.1% by weight of benzthiazole and aniline and a melting point of from 178 to 180° C. (theoretical 181° C.).

(b) By way of comparison, 50 g. of the same crude melt were directly run in to the same quantity of equally concentrated sodium hydroxide solution at a temperature of 70° C. A cloudy solution was formed from which a brownish-black mass was precipitated after standing for 8 hours at 70° C. The supernatent solution was poured off and acidified with sulphuric acid up to pH value of 7. The 2-mercaptobenzthiazole precipitated was greyish-yellow in colour. It was washed and dried. Analysis revealed a content of 91.3%, 2.1% by weight of benzthiazole, 0.4% by weight of aniline and a melting point of 165 to 170° C.

For further comparison, the sample directly dissolved in the sodium hydroxide solution after standing for 8 hours at 70° C. was treated for a further 2 hours with a stream of air at the same temperature as described in United States patent specification 2,631,153. This produced a slight brightening of the solution. Following the addition of sulphuric acid up to a pH value of 7, a vivid yellow product was isolated, washed and dried. Analysis revealed a content of 93.6%, 2.1% of benzthiazole and 0.3% of aniline. The product had a melting point of 169 to 172° C.

EXAMPLE 2

2100 g. per hour of a crude melt consisting of 1631 g. of 2-mercaptobenzthiazole, 8.4 g. of aniline, 46.2 g. of benzthiazole and 432.8 g. of resin-like substances, accumulate during the continuous operation of an apparatus for the production of 2-mercaptobenzthiazole by the process disclosed in United State patent specification 1,631,-871. The melt is delivered through a heated pipe to a dissolution vessel equipped with stirring mechanism into which 4200 g./hour of m-xylene were simultaneously run in. The temperature of the solution is kept at 135° C. The solution flows into an extractor into which a 2.8% sodium hydroxide solution is run in at a rate of 14,248 g./hour. The temperature is kept at 25° C. by cooling. The mixture of the organic and aqueous phase is introduced into a separation bottle in which the phases separate. The aqueous phase is delivered to the precipitation vessel into which a 20% sulphuric acid is run in at a rate of 2368 g./hour. 2-mercaptobenzthiazole accumulates in a quantity of 1600 g./hour. After washing and drying, it has a melting point of from 178 to 180.5° C. The aniline and benzthiazole content is less than 0.1% by weight, and the iodometrically determined 2-mercaptobenzthiazole content amounts to 98.8%. The yield is greater than 99% by weight, based on the content in the crude melt.

The organic phase of 4687 g./hour is delivered to a continuous-cycle distillation column. 4180 g. of m-xylene are distilled off from the head of the column, a mixture of 8 g. of benzthiazole and 45 g. of aniline are distilled off from an outlet in the side of the column whilst 433 g. of resin-like substances are distilled off from the sump of the column. The xylene is recycled to the extraction stage, the aniline and the benzthiazole to the synthesis stage.

What is claimed is:

1. A process for recovering a high yield of high purity 2-mercaptobenzthiazole from a crude reaction melt obtained from aniline, sulphur and carbon disulphide which comprises the steps of dissolving hot crude reaction mixture in a solvent, extracting 2-mercaptobenzthiazole from the resulting solvent solution at a temperature of from 10 to 30° C. with dilute aqueous alkali metal hydroxide solution, separating resulting aqueous and solvent phases and precipitating 2-mercaptobenzthiazole from the separated aqueous phase by acidification.

2. The process as claimed in claim 1, wherein aliphatic, cycloaliphatic or aromatic hydrocarbons boiling at temperatures above 60° C. and below 160° C., are used to dissolve the crude melt.

3. The process as claimed in claim 1, wherein the hydrocarbon solution is extracted with an aqueous alkali metal hydroxide solution whose concentration is such that the 2-mercaptobenzthiazole salt solution left after extraction has a 2-mercaptobenzthiazole content of from 1 to 50% by weight.

4. The process as claimed in claim 1, wherein the hydrocarbon solution is extracted at a temperature of from 20 to 30° C.

References Cited
UNITED STATES PATENTS

| | | | |
|---|---|---|---|
| 3,030,373 | 4/1962 | Szlatinay | 260—306 |
| 3,131,196 | 4/1964 | Wood | 260—306 |
| 3,299,086 | 1/1967 | Gollmer et al. | 260—306 |

OTHER REFERENCES

Sebrell et al.: J. Am. Chem. Soc., 45, 2390–9 (1923).

RICHARD J. GALLAGHER, Primary Examiner